US012544655B2

(12) United States Patent
Bedwell

(10) Patent No.: US 12,544,655 B2
(45) Date of Patent: Feb. 10, 2026

(54) ANALOG STICK CALIBRATION

(71) Applicant: Sony Interactive Entertainment Europe Limited, London (GB)

(72) Inventor: Gregory James Bedwell, Bristol (GB)

(73) Assignee: Sony Interactive Entertainment Europe Limited, London (GB)

( * ) Notice: Subject to any disclaimer, the term of this patent is extended or adjusted under 35 U.S.C. 154(b) by 285 days.

(21) Appl. No.: 18/170,655

(22) Filed: Feb. 17, 2023

(65) Prior Publication Data

US 2023/0256329 A1 Aug. 17, 2023

(30) Foreign Application Priority Data

Feb. 17, 2022 (GB) ..................................... 2202144

(51) Int. Cl.
*A63F 13/24* (2014.01)
*A63F 13/211* (2014.01)
*A63F 13/22* (2014.01)
*A63F 13/44* (2014.01)

(52) U.S. Cl.
CPC ............ *A63F 13/22* (2014.09); *A63F 13/211* (2014.09); *A63F 13/44* (2014.09)

(58) Field of Classification Search
CPC ........ A63F 13/22; A63F 13/42; A63F 13/211; A63F 13/44; A63F 2300/1018
See application file for complete search history.

(56) References Cited

U.S. PATENT DOCUMENTS

2004/0222965 A1* 11/2004 Riccomini .............. G06F 1/169 345/156
2008/0154533 A1* 6/2008 Poulsen .................. G06F 3/038 702/127
2013/0100021 A1 4/2013 Larsen et al.
2017/0255279 A1 9/2017 McClive et al.
2019/0118088 A1* 4/2019 Nelson .................. G06F 3/0383
2019/0126136 A1* 5/2019 Minamino .............. A63F 13/98
2019/0126140 A1 5/2019 Nelson et al.
2020/0016486 A1* 1/2020 Minamino .............. G06F 3/033

OTHER PUBLICATIONS

Extended European Search Report in European Appln. No. 23157372.6, mailed on Jun. 9, 2023, 8 pages.

* cited by examiner

*Primary Examiner* — David L Lewis
*Assistant Examiner* — Shauna-Kay N. Hall
(74) *Attorney, Agent, or Firm* — Fish & Richardson P.C.

(57) ABSTRACT

A method for calibrating a dead-zone of an analogue stick of a controller for a gaming system, the method comprising: determining a stationary time period, wherein the stationary time period is a period of time since the controller previously moved; when the stationary time period is equal to or greater than a threshold time period, determining a current position of the analogue stick of the controller relative to a neutral position of the analogue stick; and when the current position of the analogue stick is outside a dead-zone of the analogue stick, generating an adjusted dead-zone by adjusting a geometry of the dead-zone, wherein the current position of the analogue stick is inside the adjusted dead-zone.

20 Claims, 6 Drawing Sheets

ANALOG STICK CALIBRATION

CROSS-REFERENCE TO RELATED APPLICATION

This application claims priority to UK Patent Application No. GB 2202144.8 filed Feb. 17, 2022, the disclosure of which is hereby incorporated herein by reference.

FIELD OF THE DISCLOSURE

The following disclosure relates to methods for calibrating an analogue stick of a controller for a gaming system. Computer programs, systems and devices implementing the methods are also described.

BACKGROUND

A controller for a gaming system is an input device that enables a user to provide input to the gaming system, e.g. to play a video game. Such controllers typically include input elements such as a set of buttons and one or more analogue sticks (also called control sticks, thumb sticks, or sticks) to be operated by a user. The positions of the buttons and analogue sticks, as well as the shape of the controller itself, are designed to be as user friendly as possible in order to provide a comfortable and enjoyable gaming experience.

Analogue sticks project from the controller and can be moved by a user, for example by tilting or sliding, in any circumferential direction around a central "neutral" position, with the stick being biased to return to the neutral position making it also the default position for the stick. Input from an analogue stick is provided based on the position of the stick relative to the neutral position, and can typically be across a 360 degree angle range of movement at different amplitudes.

However, analogue sticks can suffer from drift (also called controller drift and analogue stick drift), where the stick can provide a false input that does not properly correspond to the user's operation of the stick. An analogue stick affected by drift might even send input to a gaming system when the user is not touching the controller at all. Such erroneous input can affect overall gaming experience.

Accordingly, it is desirable to provide an improved way of compensating for analogue stick drift to reduce or even entirely eliminate drift without unduly compromising analogue stick sensitivity.

SUMMARY OF THE DISCLOSURE

According to a first aspect, the present disclosure provides a method for calibrating a dead-zone of an analogue stick of a controller for a gaming system, the method comprising: determining a stationary time period, wherein the stationary time period is a period of time since the controller previously moved; when the stationary time period is equal to or greater than a threshold time period, determining a current position of the analogue stick of the controller relative to a neutral position of the analogue stick; and when the current position of the analogue stick is outside a dead-zone of the analogue stick, generating an adjusted dead-zone by adjusting a geometry of the dead-zone, wherein the current position of the analogue stick is inside the adjusted dead-zone.

The term gaming system as used herein refers to an electronic video game system including a device such as a video game console, or a personal computer (PC). The gaming system is capable of executing software including one or more of games, applications such as video streaming, music playback, video and audio call applications, etc.

The neutral position of the analogue stick is the intended default position of the stick, i.e. the default position of the stick when no drift is affecting the analogue stick. This neutral position is typically at the centre of the range of circumferential movements possible for the analogue stick, and the analogue stick is biased to return to the neutral position. The principle underlying this is that when the user is not operating the analogue stick, it returns to the default position which the gaming system interprets as 'no input'. Drift introduces an error so that even when the user is not operating the controller, a non-zero input is registered.

The current position of the analogue stick refers to the position of the analogue stick that is currently detected by the controller and/or a gaming system. This may be the same as the actual current physical position of the analogue stick, or may be different to the actual current physical position of the analogue stick—for example if a component of the controller used to detect the position of the analogue stick is faulty.

The dead-zone corresponds to a region of possible positions of the analogue stick that will be ignored by the controller and/or the gaming system. That is, the controller and/or gaming system will register an input when the analogue stick is positioned or moved to any position outside the dead-zone. When the analogue is positioned or moved to any position inside the dead-zone, the controller and/or gaming system will not register an input.

For ease of description, the description of the disclosure refers to the controller registering an input (or not), and movements/inputs of the analogue stick being ignored by the controller and/or gaming system. It will be appreciated that the specifics of whether and how an input from an analogue stick is registered or not depends on how the method is implemented. For example, the controller may ignore the current position of the analogue stick when it is inside the dead-zone, and so not register an input or send an input to the gaming system. In another example, the controller will also register the current position of the analogue stick, even when it is inside the dead-zone, and send a corresponding input to the gaming system which will then ignore the input if it corresponded to a current position of the analogue stick inside the dead-zone. In summary, the disclosure relates to calibrating a dead-zone and is not limited to any particular method of registering input of an analogue stick.

Dead-zone calibration refers to adjusting the geometry of the dead-zone of an analogue stick, thereby generating an adjusted dead-zone. The geometry of the dead-zone refers to the shape and size of the dead-zone. Therefore adjusting the geometry of the dead-zone refers to adjusting the shape and/or size of the dead-zone.

Using the method of the first aspect means that controller drift can be compensated for without a user ever knowing that there was an issue. The method may also compensate for drift at the gaming system level (e.g., by the operating system (OS) of the gaming system), rather than at the sub-level of individual games. If an input element of the controller, such as a button or analogue stick, is not operated for an extended period of time this might suggest the controller is not being used. However, this lack of input element operation may likely be due to another reason such as, for example, a video game application not requiring any input during that period of time. However, if the controller itself has not moved for an extended period of time (the threshold time period) this strongly indicates the controller is not being used. Therefore, the current position of an analogue stick being away from the neutral position of the stick after this threshold time period is likely due to drift affecting the analogue stick. Adjusting the geometry of the dead-zone such that the current position of the analogue stick is then within the adjusted dead-zone means that an input due to controller drift will be ignored, and that the dead-zone is adjusted without affecting the game-playing experience as the controller is not in use.

Preferably, determining the stationary time period comprises measuring a period of time since a motion sensor of the controller previously detected movement of the controller. Movement of the controller refers to translational and/or rotational movement of the controller. This movement can be detected using sensors associated with the controller, e.g. accelerometers, gyroscopes, etc.

In this way, the controller or gaming system is able to detect when the controller previously moved. Measuring the period of time may be performed by the controller or by another device of the gaming system.

Preferably, the method further comprises: determining an analogue stick time period by measuring a period of time since the analogue stick previously moved; and the step of determining the current position of the analogue stick of the controller relative to the neutral position of the analogue stick is only performed when the stationary time period and the analogue stick time period are each equal to or greater than the threshold time period.

In this way, the method determines that the controller is not being used by considering both the movement of the controller itself and the analogue stick of the controller. This provides greater certainty that the controller is not being used and so ensures the dead-zone is not adjusted while the controller is in use.

Preferably, adjusting the geometry of the dead-zone comprises increasing the size of the dead-zone.

Preferably, adjusting the geometry of the dead-zone comprises: identifying a point on the perimeter of the dead-zone that is closest to the current position of the analogue stick; setting a position of the identified point equal to the current position of the analogue stick; and adjusting the perimeter of the dead-zone to include the new position of the identified point. In this way, the shape of the dead-zone is adjusted as little as necessary to encompass the "drift position" of the analogue stick (i.e. the current position of the analogue stick after determining it is affected by drift), thereby compensating for drift while minimising the impact on analogue stick sensitivity.

Optionally, a shape of the adjusted dead-zone is a non-circular shape.

In this way, the dead-zone may be adjusted to closely or exactly correspond to any drift of the analogue stick, thereby compensating for drift while minimising the size of the adjusted dead-zone and maximising controller responsiveness.

Optionally, a shape of the adjusted dead-zone is a circle centred on the neutral position of the analogue stick.

In this way, the adjusted dead-zone will compensate for drift while also providing a uniform dead-zone preferred by some users. The uniform dead-zone means that the distance required to move the analogue stick in order to provide an input that is not ignored is the same distance in every direction from the neutral position. The shape of the adjusted dead-zone being configured in this manner simplifies adjusting the geometry of the dead-zone and reduces the processing resources used by the method.

Optionally, determining the current position of the analogue stick comprises determining a movement vector between the neutral position of the analogue stick and the current position of the analogue stick.

In this way, the direction and magnitude of the analogue stick drift may be determined and used to compensate against the drift associated with the movement vector only. For example, by generating an adjusted dead-zone with a non-circular shape.

Optionally, determining the current position of the analogue stick includes determining the stick displacement between the current position of the analogue stick and the neutral position of the analogue stick.

In this way, when the shape of the adjusted dead-zone is a circle centred on the neutral position of the analogue stick, processing resources are saved as only the information necessary for generating an adjusted dead-zone is determined.

According to a second aspect, the present disclosure provides a gaming system comprising a base unit and a controller in communication with the base unit, wherein the base unit is configured to perform a method according to the first aspect.

The base unit of the gaming system may be a device such as a video game console or a PC. The controller may be physically connected to the base unit (e.g. through a wire or being combined with the base unit in a single device) or may be separate from the base unit and communicate wirelessly with the base unit.

According to a third aspect, the present disclosure provides a computer program comprising instructions which, when executed by a gaming system, cause the gaming system to perform a method according to the first aspect.

According to a fourth aspect, the present disclosure provides a non-transitory storage medium storing instructions which, when executed by a gaming system, cause the gaming system to perform a method according to the first aspect.

According to a fifth aspect, the present disclosure provides a signal storing instructions which, when executed by a gaming system, cause the gaming system to perform a method according to the first aspect.

BRIEF DESCRIPTION OF DRAWINGS

Embodiments of the present disclosure are described below, by way of example only, with reference to the accompanying drawings, in which.

DETAILED DESCRIPTION

Figure 1:
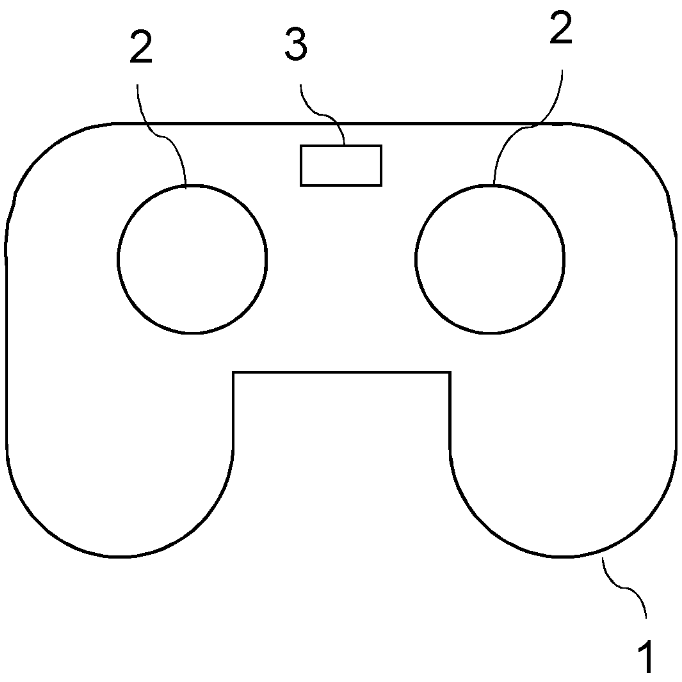
FIG. 1 is a schematic diagram of a controller for a gaming system in which the disclosure may be operated.

Referring to FIG. 1, a controller 1 for a video game system (gaming system) is shown. The controller 1 has two analogue sticks 2 that a user can operate to provide input to the gaming system. The terms "user" and "player" are used interchangeably herein. Though the controller 1 of FIG. 1 has two analogue sticks 2, embodiments of the disclosure can be implemented in a controller that has at least one analogue stick. The controller 1 also includes a motion sensor 3 configured to detect movement of the controller 1. The motion sensor 3 may detect translational and/or rotational movement, and some controllers 1 will include additional motion sensors 3 to more accurately detect motion of the controller 1. The motion sensor 3 can comprise one or more accelerometers and/or gyroscopes, etc.

Analogue sticks 2 are moveable (e.g. by a user tilting or sliding the stick 2) and input from an analogue stick 2 is provided based on the current position 10 of the analogue stick 2 relative it's default, neutral position 12. Typically, position measurement elements in the controller 1, such as potentiometers, are used to measure the exact position of the stick 2 within its full range of motion 14. The current position 10 of the stick 2 refers to the position of the analogue stick 2 that is currently detected by the controller 1 and/or a gaming system. This may be the same or different to the current physical position of the stick 2.

Figure 2A:
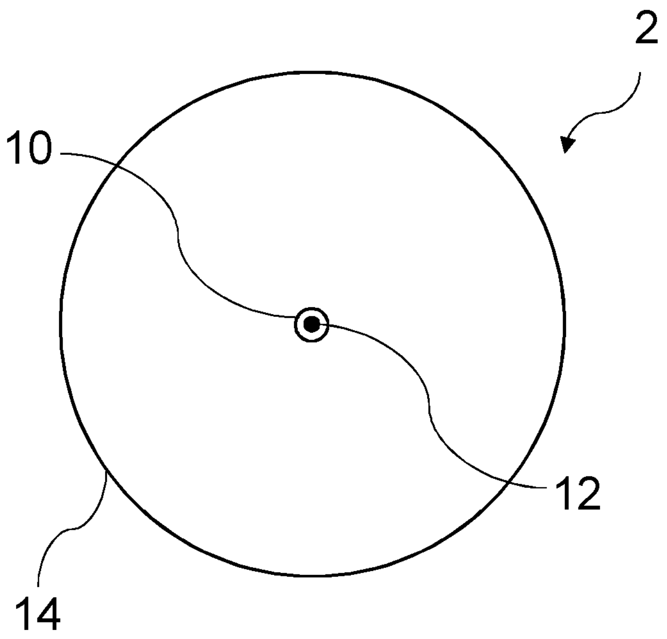
FIGS. 2A and 2B are schematic diagrams of an analogue stick of a controller in a neutral position and the analogue stick not in a neutral position, respectively.
Figure 2B:
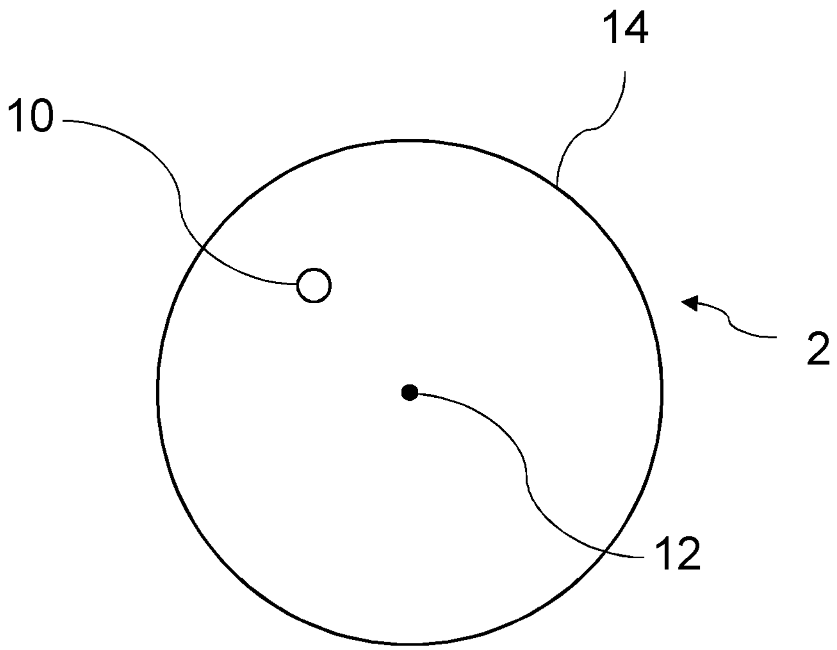

FIGS. 2A and 2B show schematic diagrams of an analogue stick 2 where the stick 2 is moveable in a circumferential direction around the neutral position 12 at the centre of the range of motion 14. FIG. 2A shows the analogue stick 2 when its current position 10 is at (i.e. the same as) the neutral position 12 at the centre of the circumferential range of motion 14 of the analogue stick 2. FIG. 2B shows the analogue stick 2 after moving away from the neutral position 12, so that its current position 10 is not the same as the neutral position 12.

The analogue stick 2 is typically biased to return to the neutral position 12. This is preferable as it improves the user experience but is not necessary for the analogue stick 2 to function and provide input. While FIGS. 2A and 2B show an analogue stick 2 moveable in circumferential directions, other analogue sticks (not shown) may only be moveable along a linear direction. It will be appreciated that the methods of the disclosure are also applicable to such linear analogue sticks.

Figure 3A:
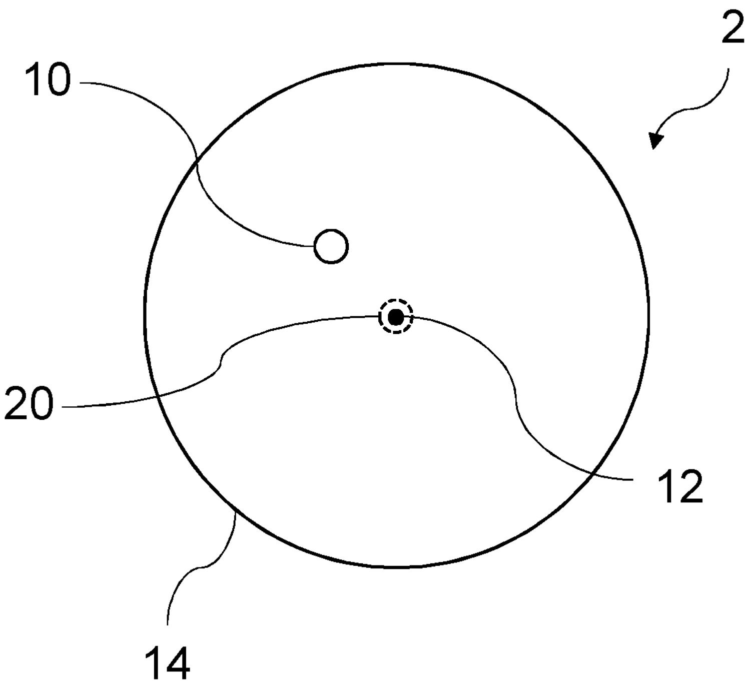
FIGS. 3A and 3B are schematic diagrams of an analogue stick of a controller, respectively showing a dead-zone of the analogue stick and an adjusted dead-zone according to an embodiment of the disclosure.
Figure 3B:
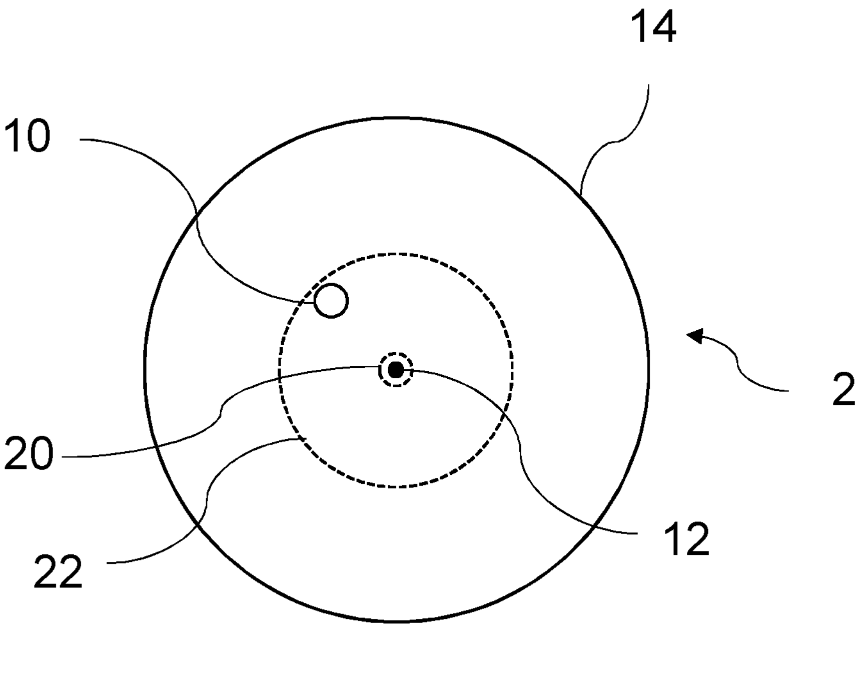

FIGS. 3A and 3B show schematic diagrams of an analogue stick 2, further illustrating a dead-zone 20 of the analogue stick 2 and (in FIG. 3B) an adjusted dead-zone 22 of the analogue stick 2. In FIG. 3A, the current position 10 of the analogue stick 2 is outside the dead-zone 20 of the analogue stick 2. This means the controller 1 and/or a gaming system in communication with the controller 1 will register an input corresponding to the current position 10 of the analogue stick 2. When the current position 10 of the analogue stick 2 is inside the dead-zone 20, the input corresponding to the current position 10 of the analogue 2 will not be registered, or may be registered but subsequently ignored.

In FIG. 3A, the current position 10 of the analogue stick 2 is outside the dead-zone 20. This may be due to a user operating the controller 1 who has moved the analogue stick 2 away from the neutral position 12 and outside the dead-zone 20. However, the analogue stick 2 may be affected by drift that has caused the current position 10 to be away from the neutral position 12—even when a user is not using the controller 1.

Figure 5:
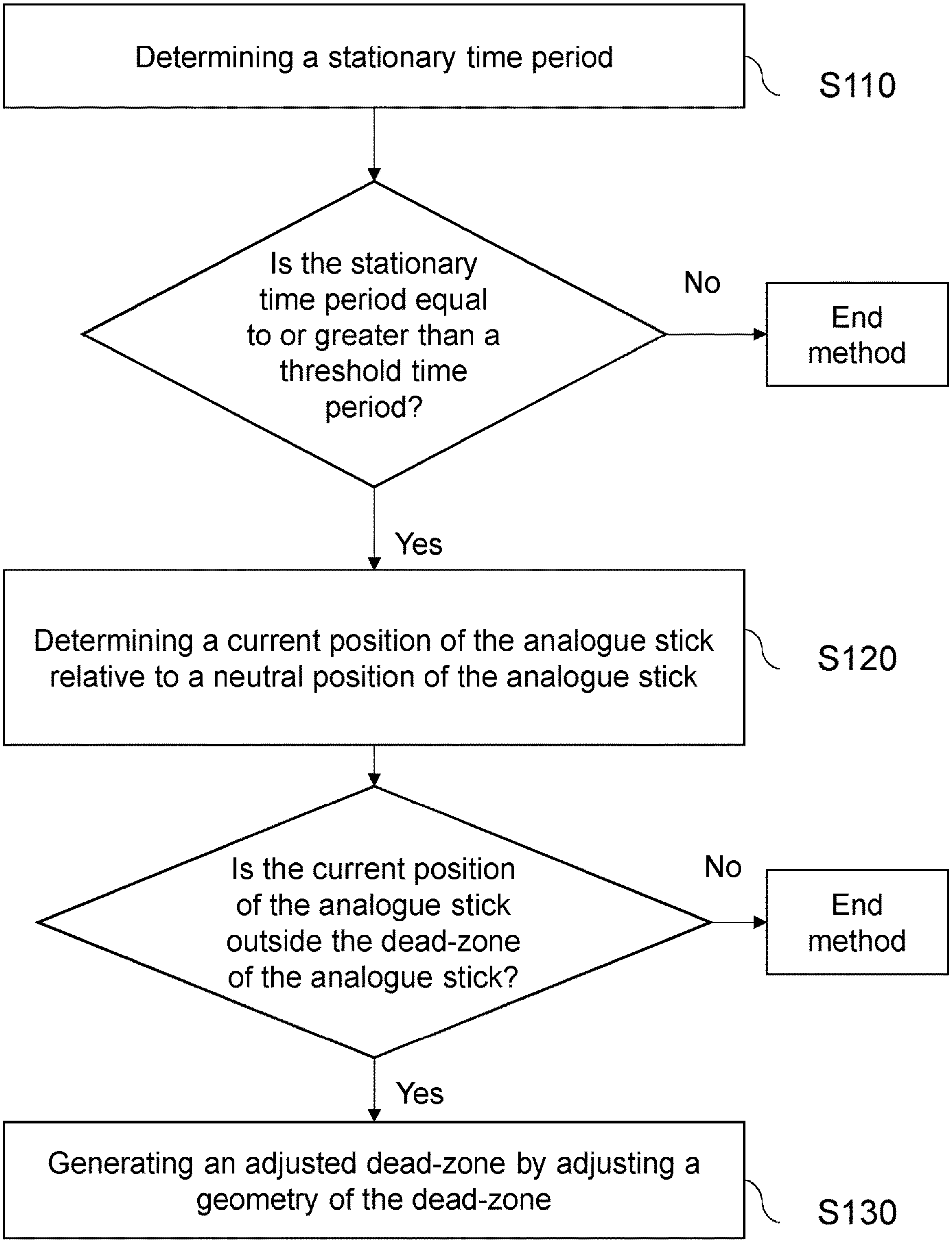
FIGS. 5 and 6 are flow charts schematically illustrating steps of methods according to the disclosure.

FIG. 5 shows a method of the disclosure used to determine whether the analogue stick 2 is affected by drift, and to compensate for the drift when the stick 2 is affected.

At step S110 of FIG. 5, a stationary time period is determined. The stationary time period is a period of time since a controller 1 previously moved. In an example of the method, the stationary time period may be determined by measuring a period of time since a motion sensor 3 of the controller 1 previously detected movement of the controller 1 (e.g., translational and/or rotational movement). In other examples, the period of time since the controller 1 previously moved may be measured using motion sensors that are separate to the controller 1 (e.g. infrared sensors of a gaming system in communication with the controller 1).

Controllers for gaming systems are held by a player during use, and so movement of the controller 1 indicates the player is currently using the controller 1. If the controller 1 has not moved for a pre-set period of time (i.e., a threshold time period), this indicates the controller 1 is not currently being used. Therefore, when the stationary time period is equal to or greater than the threshold time period, it is unlikely that the controller 1 is being used, and so the cause of a current position 10 of an analogue stick 2 of the controller 1 being away from the neutral position 12 is likely drift. Thus, when the stationary time period is equal to or greater than the threshold time period, step S120 is performed. When the stationary time period is not equal to or greater than the threshold, the current iteration of the method is ended.

The threshold time period can be selected by a skilled person having the benefit of the present disclosure according to the specific situation at hand. Example threshold time periods include between 10 and 60 seconds, between 1 minute and 5 minutes, between 1 minute and 10 minutes, and so on.

At step S120, the current position 10 of the analogue stick 2 is determined relative to a neutral position 12 of the analogue stick 2. This can be determined using commonly known techniques (e.g. using potentiometers of the controller 1).

As discussed above, when the current position 10 of the stick 2 is away from the neutral position 12 and the controller 1 is not being used, the analogue stick 2 is likely affected by drift. However, the severity of drift can vary and may already be compensated for. An analogue stick 2 affected by drift will not cause false inputs to be translated into in-game or in-app user input while the current position 10 of the stick 2 is inside the dead-zone 20 of the analogue stick 2. Therefore, compensation for drift is only required when the current position 10 of the analogue stick 2 is outside a dead-zone 20 of the analogue stick 2. Thus, when the current position 10 of the analogue stick 2 is outside the dead-zone 20 of the analogue stick 2, step S130 is performed. When the current position 10 of the analogue stick 2 is not outside the dead-zone 20 of the analogue stick 2, the current iteration of the method is ended.

At step S130, an adjusted dead-zone 22 is generated by adjusting a geometry of the dead-zone 20. The adjusted dead-zone 22 is generated such that the current position 10 of the analogue stick 2 is inside the adjusted dead-zone 22. The adjusted dead-zone 22 replaces the previous dead-zone 20 of the analogue stick 2. As the current position 10 of the stick 2 is inside the adjusted dead-zone 22, any input from the analogue stick 2 caused by drift will be ignored.

Thus, the above described method calibrates the controller 1 and/or the gaming system to compensate for drift of stick 2. As the adjusted dead-zone 22 is generated while the controller 1 is not being used, the user may not ever know that drift is affecting the analogue stick 2.

The method of FIG. 5 may be performed by the controller 1 or by another device in communication with the controller 1. For example, the other device may be a gaming system or a base unit of a gaming system, where the method is performed at the OS-level of the base unit. The steps of the method may all be performed by the same device or may be distributed between several different devices, for example a controller 1 may perform step S110 but a base device of a gaming system in communication with the controller 1 performs steps S120 and S130.

It will be apparent that the method only checks whether the controller 1 is affected by drift (by performing step S120) when it has been established (by step S110) that the controller is not in use. This is because, when the controller 1 is in use, it cannot be determined whether a current position 10 of the analogue stick 2 is due to drift or due to a player moving the stick 2. Therefore performing step S120 (and subsequently S130) while the controller is in use would waste processing resources. In addition, adjusting the dead-zone 20 while the controller 1 is in use is likely to negatively impact the gaming experience of a player, as the responsiveness of the analogue stick 2 will be inconsistent through their play session. Therefore, the method of the disclosure compensates for drift while avoiding these issues.

In an example of the method, the geometry of the dead-zone 20 is adjusted by identifying a point on the perimeter of the dead-zone 20 that is closest to the current position 10 of the analogue stick 2. Then a position of the identified point is set (i.e. updated) to be equal to the current position 10 of the analogue stick 2. The perimeter of the dead-zone 20 is adjusted to include the new position of the identified point. The remainder of the perimeter of the dead-zone 20 can be adjusted in a variety of different manners, with examples discussed below in relation to FIGS. 3B, 4A and 4B.

Optionally, before determining the current position 10 of the analogue stick 2, the method also includes determining an analogue stick time period. This is a period of time since the analogue stick 2 previously moved and can be used, in combination with the stationary time period, to establish whether or the controller 1 is being used. If the method includes determining the analogue stick time period, then step S120 is performed when both the stationary time period is equal to or greater than the threshold time period, and the analogue stick time period is also equal to or greater than the threshold time period. In some embodiments of the disclosure there is a threshold time period associated with the analogue stick time period that is different to the threshold time period associated with the stationary time period. Requiring both the analogue stick time period and stationary time period to each be equal to or greater than the threshold time period(s) provides greater certainty that the controller 1 is not being used and so ensures the dead-zone 20 is not adjusted while the controller 1 is in use.

FIG. 3B shows a schematic of the analogue stick 2 of FIG. 3A after a method of the disclosure has been performed and the dead-zone 20 has been adjusted to generate an adjusted dead-zone 22. The original dead-zone 20 is only shown in FIG. 3B for reference and no longer has any actual effect as the adjusted dead-zone 22 is used to determine whether an input corresponding to the current position 10 of the analogue stick 2 will be registered. Indeed, from the perspective of the gaming system, dead-zone 20 no longer exists as it has been overwritten by adjusted dead-zone 22.

The adjusted dead-zone 22 of FIG. 3B is a circle centred on the neutral position 12 of the analogue stick 2. The size (radius) of the adjusted dead-zone 22 is greater than the original dead-zone 20 but the shape remains the same (circular). The circular adjusted dead-zone 22 centred on the neutral position 12 provides a uniform dead-zone, where the distance required to move the analogue stick 2 out of the adjusted dead-zone 22 (and so register an input) is the same in every direction from the neutral position 12 of the stick 2.

As the adjusted dead-zone 22 is circular, it can be generated using only the displacement between the current position 10 of the stick 2 and the neutral position 12 of the analogue stick 2. The direction of the current position 10 relative to the neutral position 12 does not need to be determined and processing resources can be saved. Thus, for the example in FIG. 3B, the step S120 of determining a current position 10 of the analogue stick 2 relative to a neutral position 12 of the analogue stick 2 may simply require determining the stick displacement between the current position 10 of the stick 2 and the neutral position 12 of the stick 2.

Figure 4A:
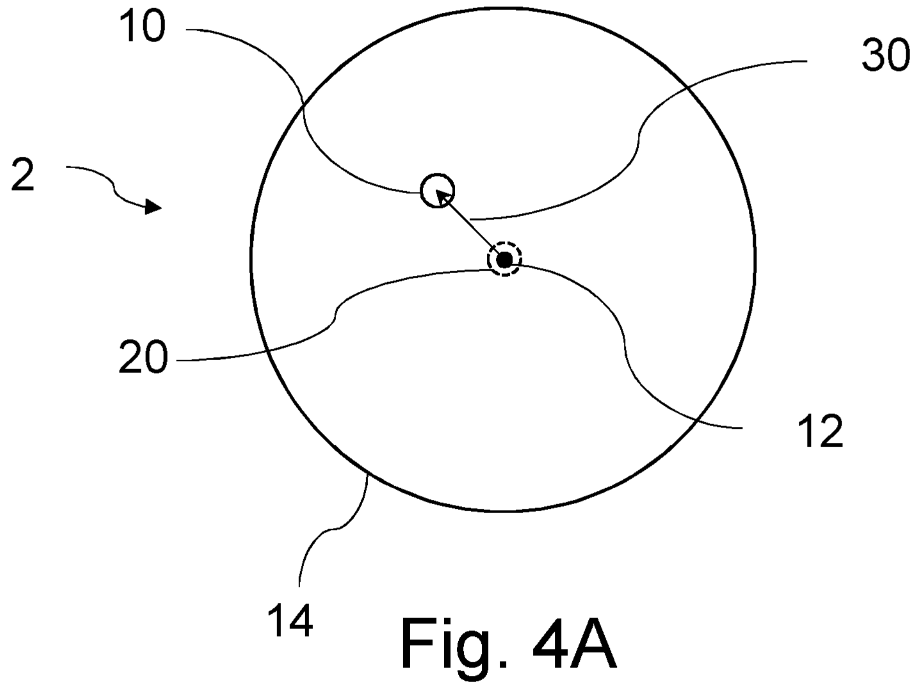
FIGS. 4A and 4B are schematic diagrams of an analogue stick of a controller, respectively showing a dead-zone of the analogue stick and an adjusted dead-zone according to another embodiment of the disclosure.
Figure 4B:
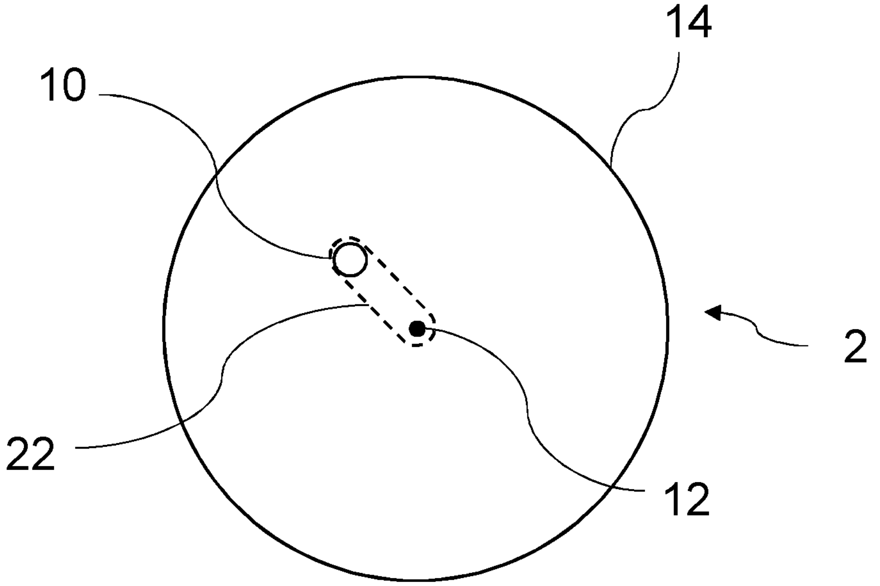

FIGS. 4A and 4B show schematics of an analogue stick 2 affected by drift. FIG. 4A shows the stick 2 before the dead-zone 20 has been calibrated and FIG. 4B shows the stick 2 after an adjusted dead-zone 22 has been generated.

Similarly to FIG. 3A, FIG. 4A shows the current position 10 of the analogue stick 2 is outside the dead-zone 20. The method of the disclosure is applied to determine whether the current position 10 of the analogue stick 2 is due to drift and, when this is the case, calibrate the dead-zone 20 to compensate for the drift by generating an adjusted dead-zone 2 (shown in FIG. 4B).

FIG. 4A demonstrates an alternative step used to determine the current position 10 of the analogue stick 2 relative to the neutral position 12 of the stick 2. That is, determining a movement vector 30 between the neutral position 12 of the stick 2 and the current position 10 of the stick 2. The movement vector 30 indicates the direction of the displacement of the current position 10 from the neutral position 12, as well as the magnitude of the displacement. When the current position 10 of the analogue stick 2 is due to drift, the movement vector 30 may also be considered a drift vector that represents the drift affecting the stick 2. This means the precise location of the current position 10 of the analogue stick 2 is determined, and so the movement vector 30 can be used to generate the adjusted dead-zone 22.

As shown in FIG. 4B, the adjusted dead-zone 22 may be a non-circular shape that corresponds closely to the movement vector 30. As the current position 10 of the stick 2 is still inside the adjusted dead-zone 22, the adjusted dead-zone 22 still compensates for drift. However, the non-circular shape of the adjusted dead-zone 22 reduces the size of the adjusted dead-zone 22 (relative to the circular adjusted dead-zone 22 shown in FIG. 3B) and so maintains the responsiveness of the analogue stick 2 as much as possible. It will be appreciated that the movement vector 30 can also be used to generate a circular adjusted dead-zone 22 when a uniform dead-zone is preferred.

Figure 6:
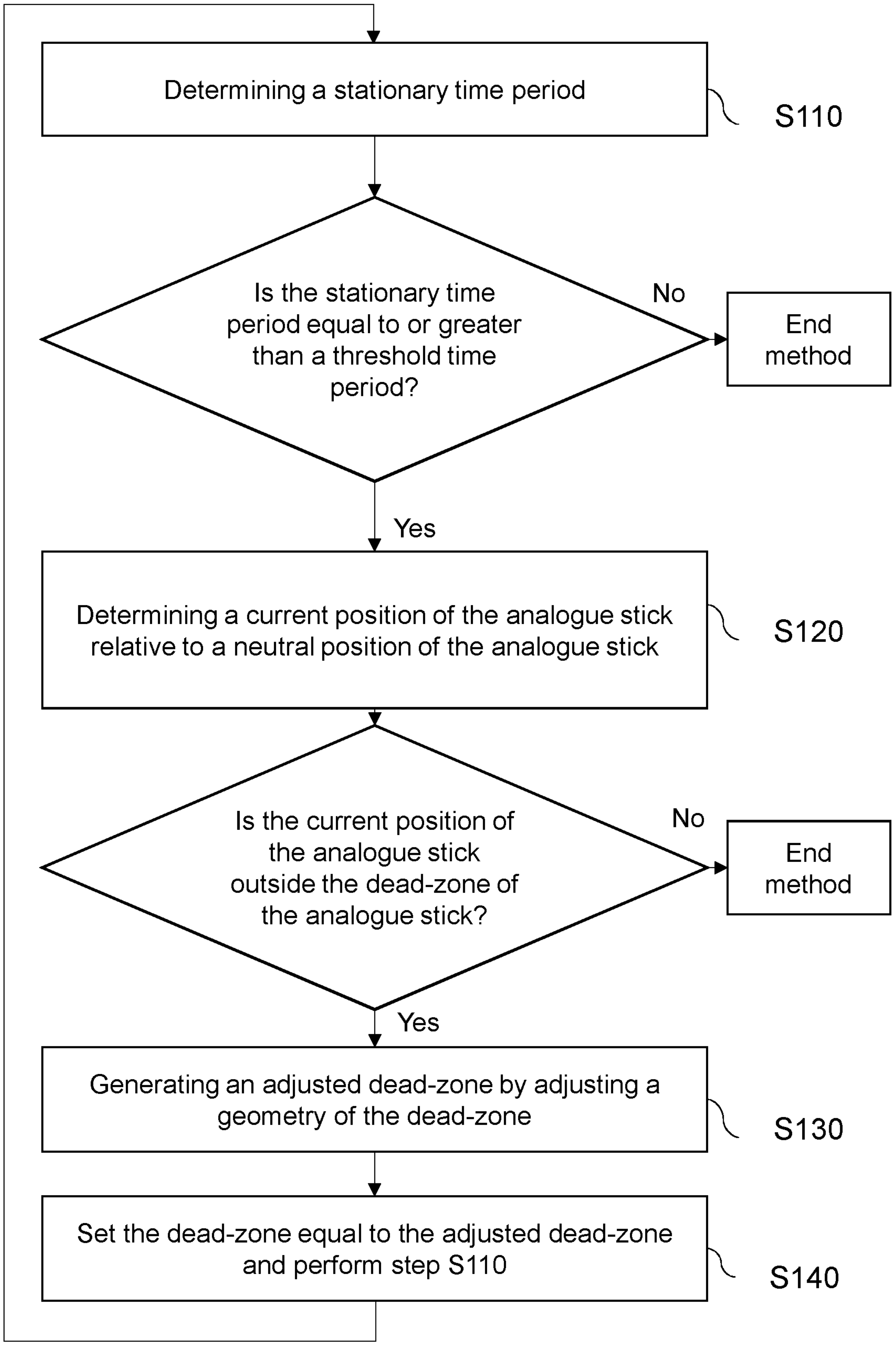

The examples shown in FIGS. 3A, 3B, 4A and 4B describe the method of the disclosure being applied when a controller 1 is first affected by drift. However, drift affecting an analogue stick 2 may develop and change over the service life of the controller 1, and so the dead-zone 20 of an analogue stick 2 may need to be adjusted multiple times to continually compensate for the changing drift. When the method of the disclosure is applied for a second or later time, the adjusted dead-zone 22 generated the previous time the method was performed is considered the dead-zone 20 for the purpose of carrying out the method again. That is, another adjusted dead-zone will be generated by adjusting the geometry of the adjusted dead-zone 22. When the dead-zone 20 is adjusted multiple times, a subsequent adjusted dead-zone may replace the previous adjusted dead-zone 22, or may combine with and incorporate the previous adjusted dead-zone 22. FIG. 6 shows an example of this where the calibration method is repeated in step S140, with the dead-zone 20 being set equal to the adjusted dead-zone 22 (i.e., the adjusted dead-zone 22 replaces the previous dead-zone 20) and step S110 is performed again. Step S110 may immediately be performed again or the system carrying out the method may have to wait for a preset period of time before performing step S110 again.

The methods of the disclosure can be performed at a range of frequencies and conditions. For example, a controller 1 or gaming system may be configured to continually execute the method, such that the controller 1 or gaming system continually performs step S110 until the stationary time period is equal to or greater than the threshold time period, and once the dead-zone 20 has been calibrated the controller 1 or gaming system again performs step S140. Alternatively, the controller 1 or gaming system performing the method may be configured to only carry out the method a specific number of times in a given interval. For example, the method may be performed on gaming system start-up or exit from sleep mode and not repeated once step S130 has been performed.

In another example, the method may only be performed once per OS boot, or not until a preset period of time has elapsed since the method was previous performed. This preset period of time can be selected by a skilled person having the benefit of the present disclosure according to the specific situation at hand. Examples of the preset period of time include between 10 and 60 minutes, between 1 hour and 6 hours, between 1 hour and 24 hours, and so on.

Having described aspects of the disclosure in detail, it will be apparent that modifications and variations are possible without departing from the scope of aspects of the disclosure as defined in the appended claims. As various changes could be made in the above methods and products without departing from the scope of aspects of the disclosure, it is intended that all matter contained in the above description and shown in the accompanying drawings shall be interpreted as illustrative and not in a limiting sense.

The invention claimed is:

1. A computer-implemented method comprising:

determining a stationary time period that reflects an amount of time since a controller previously moved;

determining that the stationary time period is equal to or greater than a threshold time period;

in response to determining that the stationary time period is equal to or greater than the threshold time period, determining a current position of an analog stick of the controller relative to a neutral position of the analog stick;

determining that the current position of the analog stick is outside of a dead-zone of the analog stick; and in response to determining that the current position of the analog stick is outside of the dead-zone of the analog stick, generating an adjusted dead-zone by adjusting a geometry of the dead-zone to include the current position of the analog stick.

2. The computer-implemented method of claim 1, wherein determining the stationary time period comprises measuring a period of time since a motion sensor previously detected movement of the controller.

3. The computer-implemented method of claim 2, wherein the motion sensor comprises at least one accelerometer or gyroscope of the controller.

4. The computer-implemented method of claim 2, wherein the motion sensor comprises an infrared sensor that is separate from the controller.

5. The computer-implemented method of claim 1, comprising:

determining an analog time period that reflects an amount of time since the analog stick previously moved; and determining that the analog time period is greater than or equal to a second threshold time period.

6. The computer-implemented method of claim 5, wherein determining the current position of the analog stick comprises determining the current position of the analog stick relative to the neutral position of the analog stick in response to determining that (i) the stationary time period is greater than or equal to the threshold time period and (ii) the analog time period is greater than or equal to the second threshold time period.

7. The computer-implemented method of claim 1, wherein adjusting the geometry of the dead-zone comprises increasing a size of the dead-zone.

8. The computer-implemented method of claim 1, wherein adjusting the geometry of the dead-zone comprises:

identifying a point on a perimeter of the dead-zone that is closest to the current position of the analog stick;

setting a position of the identified point equal to the current position of the analog stick; and adjusting the perimeter of the dead-zone to include the position of the identified point.

9. The computer-implemented method of claim 1, wherein a shape of the adjusted dead-zone is a non-circular shape.

10. The computer-implemented method of claim 1, wherein a shape of the adjusted dead-zone is a circle centered on the neutral position of the analog stick.

11. The computer-implemented method of claim 1, wherein determining the current position of the analog stick comprises determining a movement vector between the neutral position of the analog stick and the current position of the analog stick.

12. The computer-implemented method of claim 11, wherein adjusting the geometry of the dead-zone comprises generating the adjusted dead-zone based on the movement vector between the neutral position of the analog stick and the current position of the analog stick, wherein a shape of the adjusted dead-zone corresponds to the movement vector.

13. The computer-implemented method of claim 1, wherein determining the current position of the analog stick comprises determining a stick displacement between the current position of the analog stick and the neutral position of the analog stick.

14. An apparatus comprising:

one or more processors; and a non-transitory memory storing instructions that, when executed by the one or more processors, cause the apparatus to perform operations comprising:

determining a stationary time period that reflects an amount, of time since a controller previously moved;

determining that the stationary time period is equal to or greater than a threshold time period;

in response to determining that the stationary time period is equal to or greater than the threshold time period, determining a current position of an analog stick of the controller relative to a neutral position of the analog stick;

determining that the current position of the analog stick is outside of a dead-zone of the analog stick; and in response to determining that the current position of the analog stick is outside of the dead-zone of the analog stick, generating an adjusted dead-zone by adjusting a geometry of the dead-zone to include the current position of the analog stick.

15. The apparatus of claim 14, wherein determining the stationary time period comprises measuring a period of time since a motion sensor previously detected movement of the controller.

16. The apparatus of claim 15, wherein the motion sensor comprises at least one accelerometer or gyroscope of the controller.

17. The apparatus of claim 15, wherein the motion sensor comprises an infrared sensor that is separate from the controller.

18. The apparatus of claim 14, the operations comprising:

determining an analog time period that reflects an amount of time since the analog stick previously moved; and determining that the analog time period is greater than or equal to a second threshold time period.

19. The apparatus of claim 18, wherein determining the current position of the analog stick comprises determining the current position of the analog stick relative to the neutral position of the analog stick in response to determining that (i) the stationary time period is greater than or equal to the threshold time period and (ii) the analog time period is greater than or equal to the second threshold time period.

20. A non-transitory computer-readable medium storing instructions that, when executed by one or more processors, cause the one or more processors to perform operations comprising:

determining a stationary time period that reflects an amount, of time since a controller previously moved;

determining that the stationary time period is equal to or greater than a threshold time period;

in response to determining that the stationary time period is equal to or greater than the threshold time period, determining a current position of an analog stick of the controller relative to a neutral position of the analog stick;

determining that the current position of the analog stick is outside of a dead-zone of the analog stick; and in response to determining that the current position of the analog stick is outside of the dead-zone of the analog stick, generating an adjusted dead-zone by adjusting a geometry of the dead-zone to include the current position of the analog stick.

* * * * *